United States Patent
Holenstein et al.

(10) Patent No.: US 11,768,822 B1
(45) Date of Patent: Sep. 26, 2023

(54) METHOD FOR VALIDATING TRANSACTIONS IN A SYSTEM THAT INCLUDES INDETERMINISTIC ORDERING OF CHANGE LOG EVENTS BY USING DETERMINISTIC INDICIA

(71) Applicant: Gravic, Inc., Malvern, PA (US)

(72) Inventors: Paul J. Holenstein, Downingtown, PA (US); Bruce D. Holenstein, Media, PA (US); Dylan R. Holenstein, Newtown Square, PA (US); Jonathan M. Ziegler, Audubon, PA (US); Joseph A. Wynn, West Chester, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

(21) Appl. No.: 18/296,534

(22) Filed: Apr. 6, 2023

(51) Int. Cl.
| | |
|---|---|
| *G06F 7/00* | (2006.01) |
| *G06F 17/00* | (2019.01) |
| *G06F 16/23* | (2019.01) |
| *H04L 9/32* | (2006.01) |

(52) U.S. Cl.
CPC ...... *G06F 16/2358* (2019.01); *G06F 16/2365* (2019.01); *G06F 16/2386* (2019.01); *H04L 9/3239* (2013.01)

(58) Field of Classification Search
None
See application file for complete search history.

(56) References Cited

U.S. PATENT DOCUMENTS

| | | |
|---|---|---|
| 9,734,190 B1 | 8/2017 | Holenstein et al. |
| 9,804,935 B1 * | 10/2017 | Holenstein .......... G06F 11/1469 |
| 9,830,223 B1 * | 11/2017 | Holenstein .......... G06F 11/1474 |

(Continued)

OTHER PUBLICATIONS

"New Data Integrity Architectures for Mission Critical Systems." "The Connection" journal, Nov. 2021, Accessed from web page: https://connect2nonstop.com/new-data-integrity-architectures-for-mission-critical-systems/ (accessed Mar. 20, 2023), 16 pages.

*Primary Examiner* — Tuan A Pham
(74) *Attorney, Agent, or Firm* — Clark A. Jablon

(57) ABSTRACT

A method is provided for validating transactions in a system that includes indeterministic ordering of change log events by using deterministic indicia. The system includes a plurality of nodes. Each node in the system includes an instance of a database used by an application, and a change log associated with the instance of the database used by the application. Each node executes transactions. Each transaction includes one or more data manipulation language (DML) or data definition language (DDL) operations. Results of the DML or DDL, operations are stored in the change log as change log events, wherein the order of the change log events stored in the change log on one node is in a different order than the order of change log events stored in the change log of at least one of the other nodes. For each transaction executing at each node, deterministic subunits of the change log events are defined. Indicia are then computed for each subunit of the change log events. The subunits are ordered by the computed indicia. Deterministic indicia are then computed for the transaction from the ordered subunits. The transaction is then validated with at least one of the other nodes using the deterministic indicia. The validation indicates either a match or a mismatch of the deterministic indicia computed at the plurality of nodes.

29 Claims, 5 Drawing Sheets

Flowchart for a Preferred Embodiment

(56) References Cited

U.S. PATENT DOCUMENTS

| | | | |
|---|---|---|---|
| 9,922,074 B1 | 3/2018 | Hoffmann et al. | |
| 10,452,648 B1 * | 10/2019 | Holenstein | G06F 16/2379 |
| 10,467,223 B1 | 11/2019 | Holenstein et al. | |

* cited by examiner

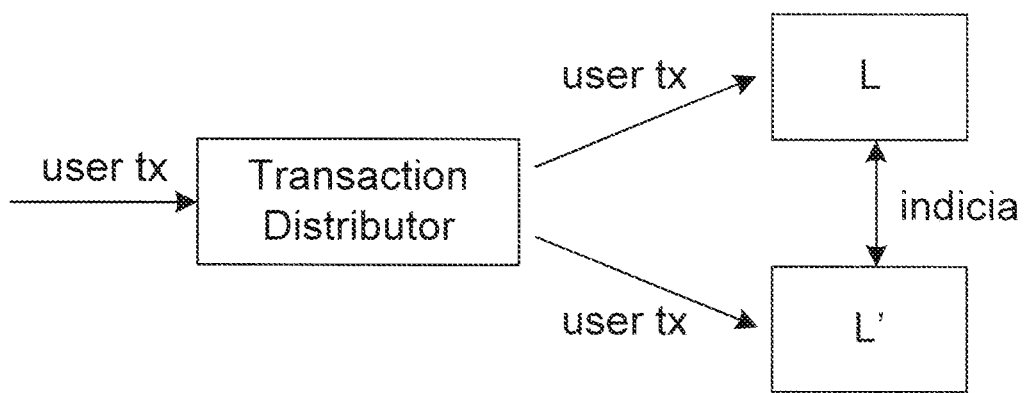
Figure 1: PRIOR ART: Dual Server Reliability Validation Architecture

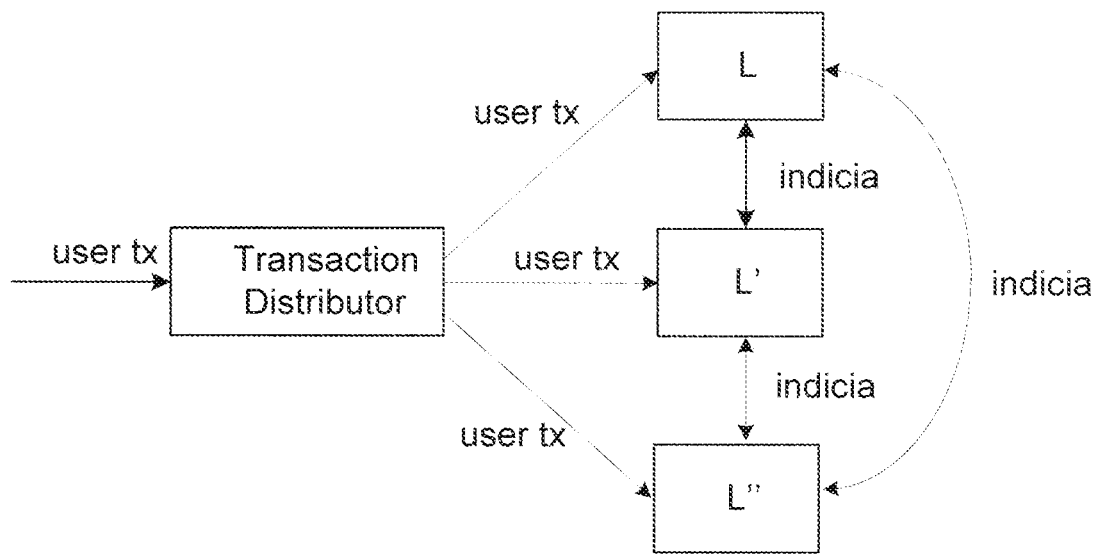
Figure 2: PRIOR ART: Triple Server Reliability Validation Architecture

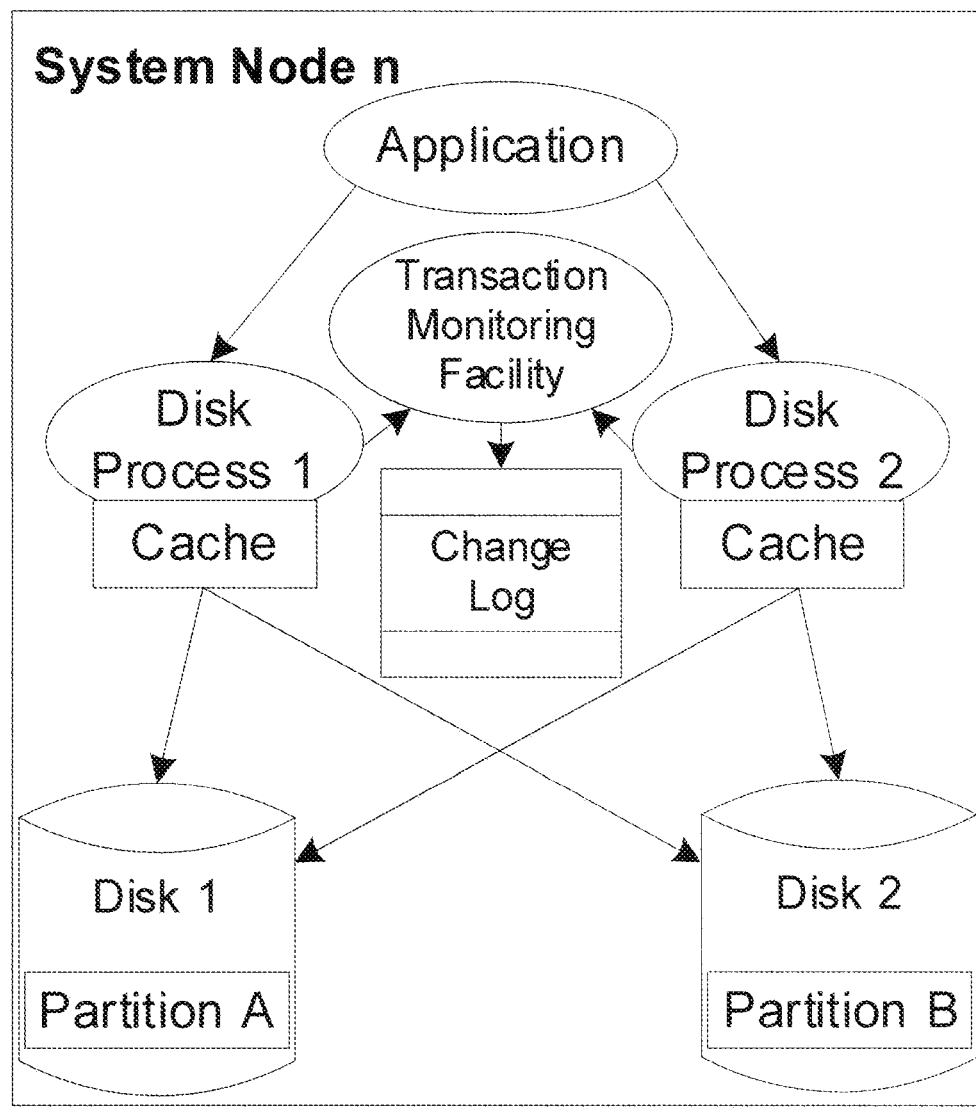
Figure 3: PRIOR ART: Typical node with partitions spread over multiple disks

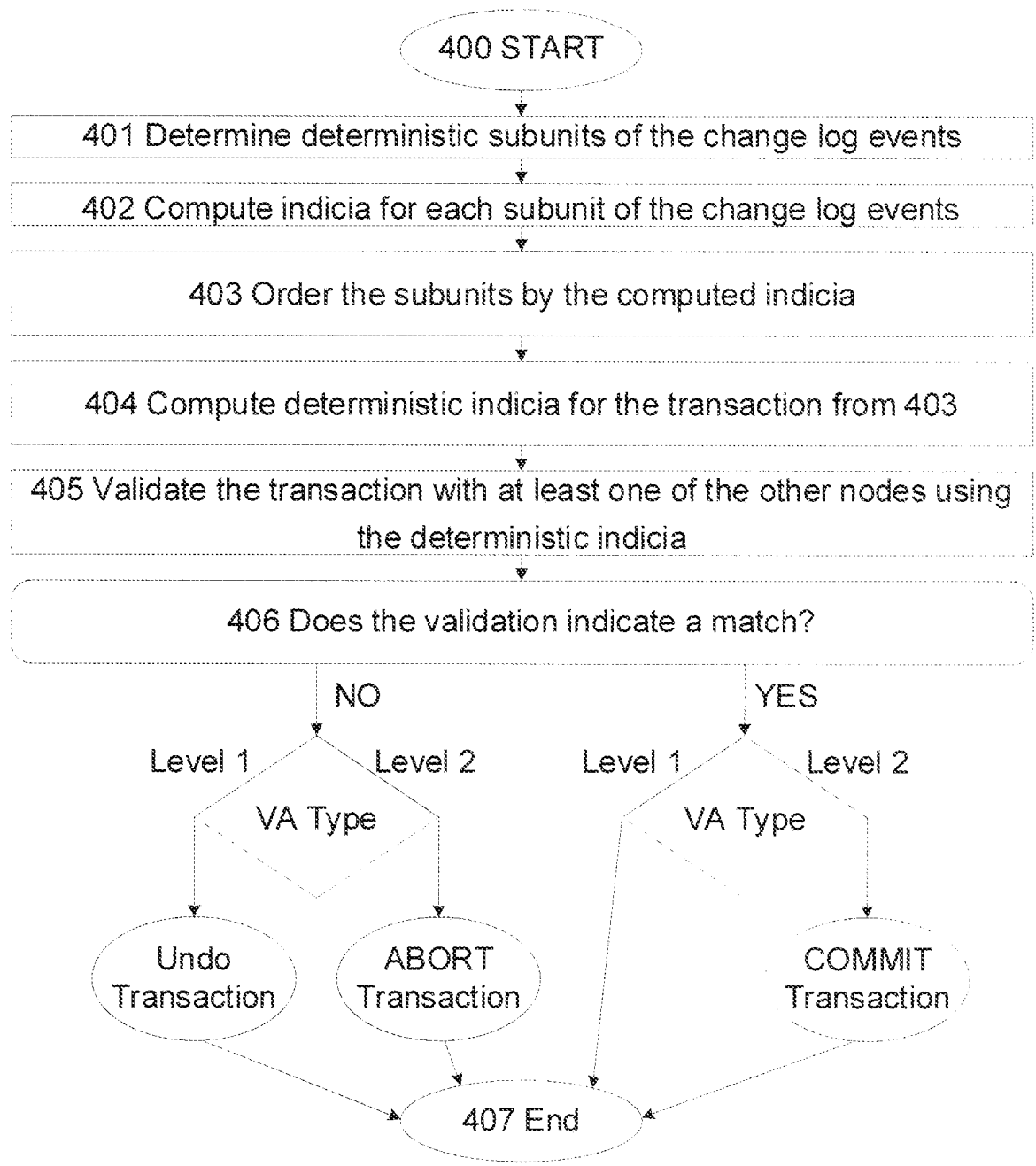
Figure 4: Flowchart for a Preferred Embodiment

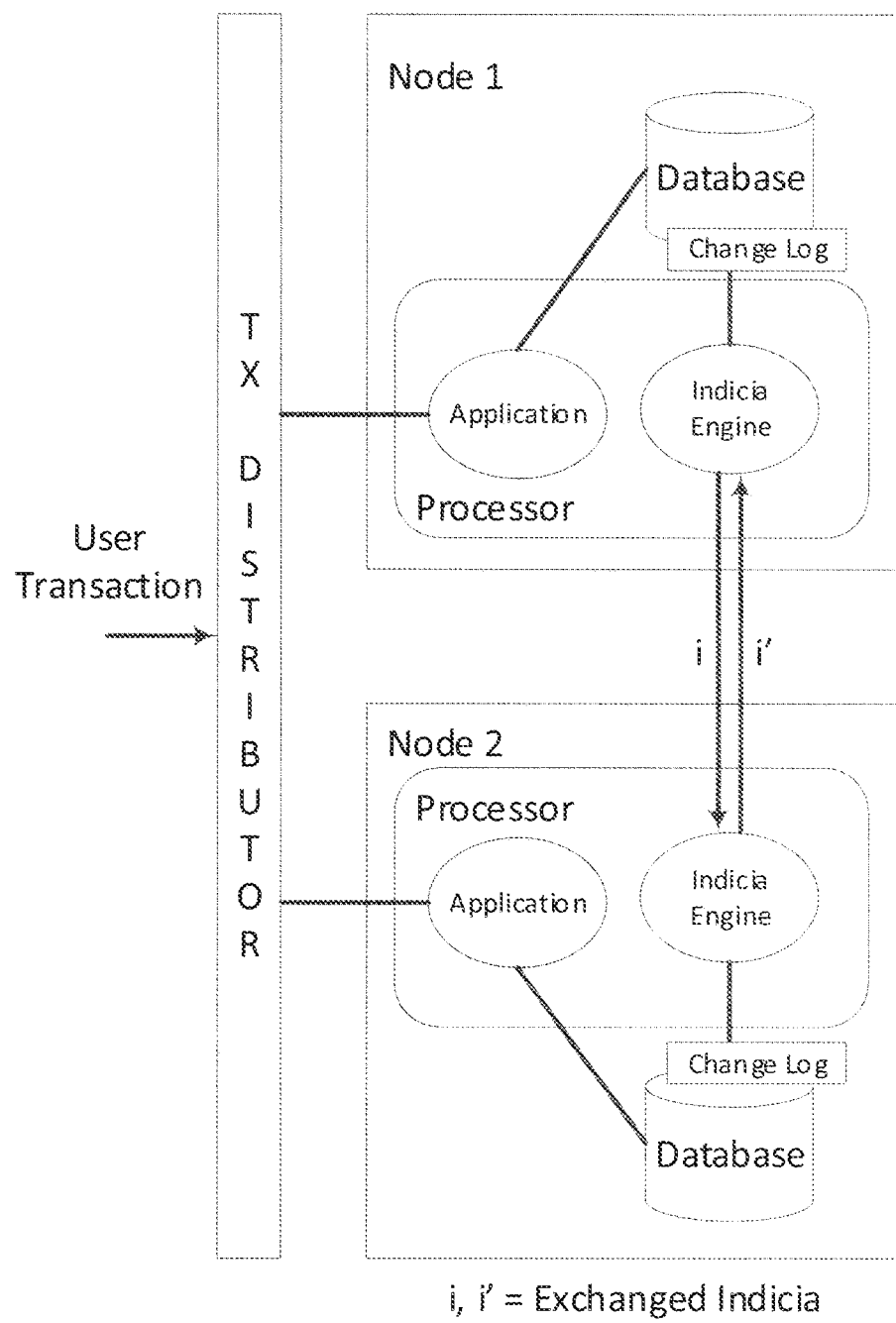
Figure 5: Apparatus

METHOD FOR VALIDATING TRANSACTIONS IN A SYSTEM THAT INCLUDES INDETERMINISTIC ORDERING OF CHANGE LOG EVENTS BY USING DETERMINISTIC INDICIA

BACKGROUND OF THE INVENTION

Certain terms used in the "Background of the Invention" are defined in the "Definitions" section.

1.1 Database Integrity and Reliability

It is imperative that the databases in a distributed system contain matching data for the duplicated data and otherwise stay in sync with each other. Any differences between them (that are not caused by normal data distribution latency) must be quickly identified and resolved, or else subsequent processing could return erroneous or inconsistent results. Database integrity issues could be introduced for a variety of reasons, for example, due to anomalies in the Audit Trails (also known as "Change Logs") that drive the data distribution engines, user error, malicious activity, hardware failures, "bit rot," and many other sources.

Prior art methods exist for comparing two databases to make sure that they match. For example, the SOLV and Compare products from Gravic, Inc., USA take a copy of some (or all) of the data in one of the databases, and send it to a daemon that reads a similar data set from the other database, comparing each field or column of every record or row in the copy to make sure they match. Using SOLV and/or Compare, extra data, missing data, or data in both databases that has divergent data subsets (e.g., a field or column in a record or row does not match), can be identified and resolved. Comparing two databases is usually accomplished in a periodic fashion, perhaps every evening after the on-line processing is completed.

1.2 Validation Architecture Systems

Validation Architecture (VA) systems ensure high database integrity for changes made in real-time to a distributed system. An example is shown in FIG. 1, and described further in U.S. Pat. No. 9,734,190 (Holenstein et al.) and U.S. Pat. No. 9,922,074 (Hoffmann et al.), which incorporates two or more nodes. With this type of architecture system, each node is processing the same user request/transaction. A Transaction Distributor sends the request to process a transaction to two nodes (L and L' in the figure). Each node calculates indicia of some sort representing the result of its current real-time processing. For instance, indicia could be calculated using a unique hash function on the transactional changes made by the system to its database.

The indicia calculated by the two nodes are exchanged and compared by each node. If they match, the transaction is committed/accepted. If they don't match, the transaction is aborted (or in some embodiments only an alert or error message are issued, or one or more nodes are shutdown, or other remediation action is taken). In this context. "match" may be an identical match, but it can also encompass forms of fuzzy or intelligent inexact matching. One example of fuzzy matching is if the two nodes use different rounding algorithms on a calculation or have different floating-point implementations. The inexact match could then consist of a tolerance such as the match is accepted if the difference is within one thousandth of a percent. Fuzzy matching could also involve utilizing only a subset of the columns affected in the transaction.

The benefit of a Validation Architecture is that it detects all single-system corruption, and many multiple-system types of corruption, such as hardware/software failures or malware in real-time to prevent the propagation of data integrity and reliability issues from cascading and destroying the soundness of the entire database or subsequent down-stream processing.

The November 2021 issue of "The Connection" journal describes Level 1 and Level 2 Validation Architectures in an article entitled "New Data Integrity Architectures for Mission Critical Systems." Level 1 Asynchronous Transaction Validation occurs when the transaction being validated has already committed (completed) before or during the computation and exchange of the indicia of the transaction outcome has been computed and exchanged for comparison. Level 2 Synchronous Transaction Validation involves the Validation Architecture system software joining the transaction as a voting member. Similar to Level 1, the indicia are calculated and exchanged. However, with Level 2 these steps occur before the transaction is committed, so if the indicia exchanged do not match, the transaction can be aborted before the damage is done to the database.

The architecture shown in FIG. 1 is a Dual Server Reliability (DSR) configuration. A Triple Server Reliability (TSR) configuration is shown in FIG. 2. All nodes process the same transaction, and their indicia are compared. If all indicia match, the transaction is committed (Level 2 VA). If only indicia of two nodes match, the transaction is committed on those two nodes; and the third node can be taken out of service or have corrective action taken. An error indication can be posted for manual resolution of the problem, if necessary.

1.3 Indicia Divergence

There are many reasons why data used to compute indicia at one node of a Validation Architecture system may not correspond to the same indicia computed at another node. Reasons include:

i. User requests may appear at the nodes participating in a Validation Architecture system out of order from the order submitted to the transaction distributor. This might be because of processing delays at the nodes, or different network routes being taken by the user requests.

ii. Disk process or transaction monitoring facility (e.g., HPE NonStop DP2 or TMF) indeterminacy in disk flushing order may not match the order that the application originally performed the database I/O at the node. For example, the application inserts record 0 and then record 1 and then record 2, but these are flushed into the change log or audit trail in a different order. When read out of the change log or audit trail to compute indicia in a Validation Architecture system, the order of the records inserted is different, leading to a different order of the transactional data at the nodes.

iii. If a node inserts three records under a transaction and commits that transaction successfully, the node file/table will have record 0, record 1, then record 2 in it. During the applying of the transaction at the node, if the transaction fails for any reason, for example, a CPU failure causes the abort after the three inserts occur but before the commit occurs, the node may have three 'empty' records at positions 0, 1, and 2 as the inserts will be backed out. If that transaction is then successfully re-applied to the node, this node would then have the other node's records 0, 1, and 2, at positions 3, 4, and 5. In this case, the node having to first abort the transaction has positions 0, 1, and 2 filled with a logical length of 0 (a result of the aborted insert), and these are typically inaccessible to applications.

iv. Another reason that the records/rows at a node may not match the physical position of those records or rows in another node is related to lower-level file or table efficiency. In some cases, the physical order of the data blocks that hold the records or rows may be reorganized by the file system, for example when the file or table has become fragmented (storage of the data blocks that hold the records or rows are no longer contiguous or sequential).

v. Another reason is that when data is loaded, copied, or replicated from one node's file or table to another file or table, certain records or rows may be either collapsed in size or removed from the load, copy, or replication process and not inserted at the other file or table. This can happen, for example, with zero-length records or rows in Entry-sequenced HPE NonStop Inscribe files or SQL tables as these can occur when the underlying TMF transaction aborts (backs out) after an insert.

vi. Other reasons why the physical (or logical) order of the data in the change log at one node may not match the physical (or logical) order of the data in the change log at the other node include files and tables that have one or more of a "SYSKEY" type of field or column in them.

1.4 What is Needed

In a Validation Architecture system, indicia are created by each node representing the changes made to the local database, and the indicia are exchanged and compared. However, if the indicia generated at each node from the duplicated transaction are different, then the indicia will not match when compared, even if the underlying transactions themselves produced identical database changes on each node.

Landed order issues at the nodes of a Validation Architecture system, for example due to TMF-flushing indeterminacy, may cause the data itself for the transactions in the change log or audit trail to be in a substantially different order at one node from what it is in at other nodes resulting in false mismatches of the compared indicia.

U.S. Pat. No. 10,467,223 (Holenstein et al.) discloses that one needs to use a deterministic indicia generation scheme which is unaffected by (or accounts for) an expected divergence of data, but is silent on a method to do that when the Validation Architecture system is using indeterministic out-of-order transactional data in the change log or audit trail to generate the indicia. The present invention aims to fulfill this need.

BRIEF SUMMARY OF THE INVENTION

An automated method is provided for calculating indicia in a system configured as a validation architecture where the indicia may not properly match among the various nodes due to issues such as indeterministic ordering of the events stored in the change logs as a result of DML and/or DDL operations of transactions executed on nodes which are redundantly processing user requests.

One preferred embodiment of the present invention solves this indicia calculation mismatch by first defining deterministic subunits of the transaction that are consistent. The resulting indicia do not deviate when calculated on the multiple nodes redundantly executing the user request. For instance, the deterministic subunits of the transaction may be the subsets of change log entries made on the disk partitions used in the transaction if the rows stored in the change log for DML operations made to the single partitions are always in the original application transaction order.

Once deterministic subunits for a transaction are defined, indicia for each subunit is computed. The subunits are then ordered or sorted by the computed indicia. Next, deterministic indicia for the transaction may be calculated from the ordered subunits. The deterministic indicia for the transaction are then used in validating the transaction with the other nodes executing the same transaction.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1 shows a prior art Dual Server Reliability (DSR) Validation architecture.

FIG. 2 shows a prior art Triple Server Reliability (TSR) Validation architecture.

FIG. 3 shows a typical node of a multi-node system with partitions spread over multiple disks.

FIG. 4 shows a flowchart of one preferred embodiment of the present invention.

FIG. 5 shows apparatus for implementing one preferred embodiment of the invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It may be represented as a sequence of {column name, value} pairs which can be implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A set of one or more nodes that work together to execute an application.

Computer—A device with one or more processors with memory and input/output devices that is configured to execute an application program.

Node—A device, such as a computer, that works together, e.g., over a network, with one or more other nodes to make up a system.

Process—A program running in a computer. A process provides one or more functions. One program can be spawned as multiple distinguishable processes, and/or utilize multiple processes. Processes usually have a name (e.g., $DISK1) or number (e.g., 12.223) that identifies it uniquely on the computer.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Redundant System—A system architecture which includes of two or more systems (e.g., nodes) that are operating in a way to increase the overall availability of the application to end users. Active/Backup and Active/Active Systems are the two primary redundant system architectures. Data replication is typically used to keep the databases in the redundant systems synchronized.

Backup—Creating a copy of a database to protect it from loss.

Online Backup—Creating a copy of an active database to protect it from loss.

Restore—Restoring a database into a consistent state by loading a backup copy and typically rolling forward changes that occurred to the backup copy once the backup was started but belfore it was completed.

Virtual Tape—Emulated magnetic tape images, usually stored on a disk, which may be remote from the source system.

Change Log (also, interchangeably referred to herein as an "audit trail")—A record of changes made to a database. It usually includes a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null. A change log may only include a record of changes made to a database, but may also include information regarding the sequence of actions that occurred, the transaction ID and timestamp for the operations recorded in the change log, and the one or more process IDs that made the changes.

Current Image—The current image is the current value of a data item (e.g., a record or a row) that is in the database.

Related Data—Data that typically must be consistent between all the data items in the data set. For example, a parent row and a child row in a classic referential integrity relationship are related. Creating the child row without the parent row violates the related data relationship. Updates to the same record or row, or to related records or rows, are related as well—replicating the updates out of order can lead to inconsistent data. Non-related data is data that does not have a consistency requirement.

Consistent Database—A database is consistent if its data is valid according to all defined rules, at least for related data. For instance, a parent row must exist for every child row that refers to it.

Record-Oriented Database—A database that is accessed by specifying a key pointing to one or more records. Analogous to a row-oriented database.

Field-Oriented Database—A database that is accessed by specifying a key pointing to a field. Analogous to a column-oriented database.

Primary Key—The primary key is a typically unique identifier for a particular record or row in a file or table. It can be created from one or more fields or columns contained in the record or row, the physical or logical or virtual location of the record or row in the file or table, record or row data content, or based on some other combination of data attributes that can be used to identify and/or locate the record or row.

Alternate Key—An alternate key is a secondary access path to the data (records or rows) in the file or table. Analogous to an index in an SQL relational database or an alternate key in an HPE NonStop Enscribe database.

Relative Key—A relative key is also called a Relative Record Number. A record or row identifier that is based on the physical or logical position of the record or row in the file or table. Often sequential, the records or rows are often a maximum fixed length in size so the position, or offset, of a particular record or row can be quickly computed from the beginning of the file or table via the relative key number.

SYSKEY—This entity is also called a system assigned key value or key values. A SYSKEY is one or more fields or columns that are automatically assigned, typically by the database, when a record or row is inserted into a file or table. They are generally unique within that file or table, and are often used as the whole or part of the primary key of that record or row. The SYSKEYs for the same record or row do not typically match across a replicated, loaded, or copied environment.

Key-sequenced file or table—This is a type of file or table that is organized (logically or physically) based on a primary or alternate key.

Relative file or table—This is a type of file or table that is organized (logically or physically) based on a relative key.

Entry-sequenced file or table—This a file or table that is organized (logically or physically) based on the insertion order of the records or rows into the file or table. Since the records or rows may be varying in length, the primary key of the record or row is often derived from the physical position of the record or row in the file or table.

Unstructured file or table—This is a file or table that has no specific structure to the contents, for example the data can be in any format and not necessarily adhere to a particular or specific record/field or table/column definition. Records or rows in an unstructured file or table can include the entire file or table contents, or be derived from attributes such as a fixed length to the records or rows, a set of one or more tokens to identify the beginning and/or end of the records or rows in the file or table (such as a carriage return/line feed at the end of the record or row), or a field in the data itself that defines the length of each record or row (such as a length field contained in the data that identifies the length of that particular record or row).

Order-sequenced files/tables—This type of file/table uses some form or ordering method to differentiate the different rows or records of a table/file. The ordering methods might be relative record number, physical order, or a primary or alternate key. Problems addressed by the present invention arise in comparing two files/tables if they differ in the ordering method used, or if the ordering method matches, but the actual records/rows in the file/table are out-of-order. e.g., from the results of operating system or database replication processing.

Data content sequenced files/tables—This type of file/table uses the contents of some or all of the data itself to differentiate the different rows or records of a table/file. The physical, logical, or virtual ordering methods of the records or rows may differ from the source to the target.

Hence, some or all of the data content of the records or rows is used to determine what is missing or extra or a duplicate between the source and the target. Problems addressed by the present invention arise in comparing two files/tables if the records or rows differ in their data content, for example no explicit ordering method exists for the records or rows as they may be inserted randomly (or differently) at both the source and the target. In some cases, there is only one record or row in the file(s) or table(s) being compared, in which case the set of file(s) or table(s) being compared are treated as separate records or rows of the file or table collection set.

Entry-Sequenced, Key-Sequenced, and Relative Files and Tables—These are types of HPE NonStop Guardian operating system file or SQL table types which are order-sequenced file types.

Unstructured Files—These are types of HPI NonStop Guardian and OSS operating system file types which are order-sequenced via the relative byte address (RBA) position of the data within them. Records inside unstructured files are usually delimited via a fixed length (for example, 100 bytes long), variable length via a length parameter contained in the data itself (for example, via a length field at the front of the each record), token delimited (for example, via strings of one or more characters, or tokens, such as carriage return/line feed, that mark the end of, or length of a record), or comma separated values (CSV) format. In some cases, there is no 'record' delimiter and the entire file, or a portion thereof, itself is considered a single record to be compared.

File or table partition—every file or table consists of one or more partitions. Often, a file or a table is divided into distinct subfiles called partitions. Each partition generally holds a unique set of the file or table's records or rows. Partitioning is often implemented to spread the data across multiple partitions, and hence disk drives, for better access or processing parallelism and to make very large files or tables fit across multiple smaller disk drives that have smaller size capacity.

File or table sharding—taking a file or table and breaking it up into distinct sets of data to allow for parallel processing on each data set to occur serially and/or in parallel.

Transaction—a transaction is the result of a specific type of request or requests that the application processes to provide a service. The transaction groups the various services needed to satisfy the request into a logical set of functions, operations, and/or processing to complete or satisfy the request (e.g., one or more data manipulation language (DML) or data definition language (DDL) operations). The transaction typically has a begin point (e.g., BEGIN step) and an end point (e.g., END step which is either a COMMIT or an ABORT). In most common commercial application environments, the transaction either will be fully implemented, or all effects of it will be removed, should the transaction fail or not be able to be completed for any reason.

Audited Transaction—A delimited set of database operations (inserts, updates, deletes, reads, create tables, and/or purge tables, etc.) that are either all made or none are made. An audited transaction is guaranteed to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions generally maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive that indicates the beginning of an audited transaction. A begin transaction directive may be explicit, or it may be implicit such as with the first database operation for a transaction.

Begin Work—Equivalent to Begin Transaction.

Commit Transaction—A directive that indicates an audited transaction has completed successfully. The directive may be implicit with database that, for example, commit on disconnect or for single row updates.

Commit Work—Equivalent to Commit Transaction.

Abort Transaction—A directive that indicates an audited transaction has been unsuccessful and should be undone.

Rollback Work—Equivalent to Abort Transaction.

Uncompleted Transaction—A transaction that has begun but has been neither committed nor aborted.

Operating System—A software facility that manages computer hardware resources and provides common services for application processes. Services include time functions, reading and writing interprocess messages, and database manipulation.

End Users (also "Users")—People, systems, devices, applications, or any other entity that can influence an application or can request or use the services that it provides.

Indicia/indicium—A representation, which is often distinguishing, of the changes that an application is going to make to the database (typically, values provided in the transaction request), or the results of the changes that were made, but perhaps not committed yet, to the database (typically, database transaction "after" values). For instance, an indicium may be a unique hash or checksum of the changes, or it might be the complete set of changes. In some cases, multiple indicium (indicia) are computed, exchanged, and compared in the Validation Architecture configuration for each transaction request. Indicia and Indicium are used interchangeably herein and do not necessarily indicate the number of indicium involved in the applicable case. Indicia are usually based on a I-lash value, such as CRC, SHA, MD5 or similar algorithm. These are calculated from sets of data, and they may be used to identify the data with fewer bits/bytes than in the original set of data. For example, a 128-bit hash value for a 100-byte string can be used to generate a 16-byte, or smaller if truncated, value which represents fairly uniquely that 100-byte string. Another 100-byte string with even one different byte will result in the generation of a completely different hash value which will almost certainly not match the hash value for the first 100-byte string. If the hash value algorithm does in fact produce the same hash value for two different input strings, then the strings themselves can always be compared if complete certainty is needed that the sets of data match. In some cases, the indicia may be the full original data, or a subset thereof.

Validation Architecture (VA)—A redundant system architecture in which two or more computing systems are actively processing the same transaction. Each system calculates indicia representing the changes that it will make, or made, to the database. If the two indicia compare, the transaction is committed (if not already committed). Otherwise, the transaction is aborted and an error is reported or in some embodiments only an alert or error message is issued, or one or more systems are shutdown, or other remediation action is taken such as:
 (i) issuing a database rollback on one of the systems,
 (ii) executing self-diagnostics on one of the systems,
 (iii) ignoring the issue, for example, if it will be repaired in a subsequent transaction,
 (iv) taking one of the systems or its application offline,
 (v) aborting the transaction executing on a subset of the systems (if more than two systems are in use), and
 (vi) resynchronizing the database at one or more systems.

Validation Architecture Systems that compute the indicia for the transaction being validated after the Commit happens on the nodes are called a Level 1 VA, and if before the Commit happens (after joining the transaction in some cases as a voting member) are called Level 2 VA.

Redundant Architecture—A system architecture that consists of two or more nodes that are operating in a way to increase the overall availability of the application to end users. Active/Backup and Active/Active Architectures are the two primary redundant system architectures.

Consistent Database—A database is consistent if its data is valid according to all defined rules. For instance, a parent row must exist for every child row that refers to it.

Record-Oriented Database—A database that is accessed by specifying a key pointing to one or more records.

Field-Oriented Database—A database that is accessed by specifying a key pointing to a field.

Row-Oriented Database—A database that is accessed by specifying a key pointing to one or more rows.

Column-Oriented Database—A database that is accessed by specifying a key pointing to a column.

Functional Overview

As previously recited, indicia in a system configured as a validation architecture may not properly match among the various nodes of the system due to many reasons described in the Background section. A primary reason that indicia may not match, which is addressed in preferred embodiments of the present invention, is the indeterministic ordering of the parts of the transactions completed on the nodes redundantly executing the user requests.

A transaction, typically following the ACID semantics, consists of a BEGIN directive (which might be implicit) followed by one or more data manipulation language (DML) or data definition language (DDL) operations such as INSERT, UPDATE, DELETE, CREATE TABLE, and/or ADD COLUMN. Normally, every transaction ends (completes) with an ABORT/ROLLBACK or COMMIT transaction directive.

As shown in FIG. 3, a typical node of a system will normally have multiple disks containing multiple disk partitions over which the database is spread in order to provide high performance, data protection, data isolation, and capacity for the applications using the database. The operating system running on the system may have one or more disk processes controlling the reading and writing to the disk partitions on the system. A disk process will normally have a local disk cache to improve read and write performance. Periodically, or when commanded, the disk process will flush and make durable the changes stored in the disk cache.

If some of the DML or DDL operations in a transaction span tables spread over multiple disk partitions, the disk processes may flush their disk caches to disk at different uncoordinated times resulting in indeterministic ordering of change log events (also, referred to herein as "audit trail events"). In many cases, no additional information is saved with the change log events that can subsequently be used to re-order those events into the actual order the application performed them in.

Tables 1a and 1b show a simple example of what may result due to flush indeterminacy on a redundant VA system with two nodes and two disk partitions on each node. The same user transaction (123) is presented to the two nodes. It consists of one insert of a row to each partition followed by an update of each row. The result is that the hashes of the rows of the transaction (here an Insert and an Update on rows on Partition A, and an Insert and an Update on rows on Partition B) result in indicia values calculated for the operations of the transaction that are the same on the two nodes, but the order is different in the change log resulting in totally different Level 1 and 2 VA indicia hash values: 0xACB234FA on Node 1 and 0xBBF234CD on Node 2. This causes an erroneous mismatch of the transaction completed on the two nodes.

TABLE 1a

Node 1: Partitions Flush Order A, B, later B, A

| User Application transaction 123 | NODE 1, Disk 1, Partition A Contents, Hash of Operation | NODE 1, Disk 2, Partition B Contents, Hash of Operation | NODE 1 CHANGE LOG, Indicia values calculated |
|---|---|---|---|
| BEGIN | | | BEGIN (implicit) |
| INSERT ROW 1 in Partition A | ROW1, 0xCB123ABC | | |
| INSERT ROW 2 in Partition B | | ROW2, 0xAB34CD22 | |
| <PARTITION A FLUSHES> | | | INSERT ROW 1 (after image stored), 0xCB123ABC |

TABLE 1a-continued

Node 1: Partitions Flush Order A, B, later B, A

| User Application transaction 123 | NODE 1, Disk 1, Partition A Contents, Hash of Operation | NODE 1, Disk 2, Partition B Contents, Hash of Operation | NODE 1 CHANGE LOG, Indicia values calculated |
|---|---|---|---|
| <PARTITION B FLUSHES> | | | INSERT ROW 2 (after image stored, 0xAB34CD22 |
| UPDATE ROW 1 to 1' | ROW 1 to 1'. 0x568CCD1A | | |
| UPDATE ROW 2 to 2' | | ROW 2 to 2' 0x785FCABC | |
| <PARTITION B FLUSHES> | | | UPDATE ROW 2 to 2' (before and after images stored), 0x785FCABC |
| <PARTITION A FLUSHES> | | | UPDATE ROW 1 to 1' (before and after images stored), 0x568CCD1A LEVEL 2 VA INDICIA: HASH OF (4) HASH VALUES FOR TX IN LOG: 0xACB234FA DOES NOT MATCH INDICIA FROM OTHER NODE! Transaction wrongly seen as corrupted! Node will vote to Abort transaction. |
| COMMIT | | | ABORT! (Level 2 VA) or COMMIT (Level 1 VA) LEVEL 1 VA INDICIA: HASH OF (4) HASH VALUES FOR TX IN LOG: 0xACB234FA DOES NOT MATCH INDICIA FROM OTHER NODE! Transaction wrongly seen as corrupted! UNDO of work/Restore of database required. |

TABLE 1b

Node 2: Partitions Flush Order B, A, later A, B

| User Application transaction 123 | NODE 2, Disk 1, Partition A Contents, Hash of Operation | NODE 2, Disk 2, Partition B Contents, Hash of Operation | NODE 2 CHANGE LOG, Indicia values calculated |
|---|---|---|---|
| BEGIN | | | BEGIN (implicit) |
| INSERT ROW 1 in Partition A | ROW1, 0xCB123ABC | | |
| INSERT ROW 2 in Partition B | | ROW2, 0xAB34CD22 | |
| <PARTITION B FLUSHES> | | | INSERT ROW 2 (after image stored, 0xAB34CD22 |
| <PARTITION A FLUSHES> | | | INSERT ROW 1 (after image stored), 0xCB123ABC |
| UPDATE ROW 1 to 1' | ROW 1 to 1', 0x568CCD1A | | |
| UPDATE ROW 2 to 2' | | ROW 2 to 2', 0x785FCABC | |
| <PARTITION A FLUSHES> | | | UPDATE ROW 1 to 1' (before and after images stored), 0x568CCD1A |
| <PARTITION B FLUSHES> | | | UPDATE ROW 2 to 2' (before and after imagesstored), 0x785FCABC LEVEL 2 VA INDICIA: HASH OF (4) HASH VALUES FOR TX IN LOG: 0xBBF234CD DOES NOT MATCH INDICIA FROM OTHER NODE! Transaction wrongly seen as corrupted! Node will vote to Abort transaction. |
| COMMIT | | | ABORT! (Level 2 VA) or COMMIT (Level I VA) LEVEL I VA INDICIA: HASH OF (4) HASH VALUES FOR TX IN LOG: 0xBBF234CD DOES NOT MATCH INDICIA FROM OTHER NODE! Transaction wrongly seen as corrupted! UNDO of work/Restore of database required. |

A preferred embodiment of the present invention solves this indicia calculation mismatch problem resulting from indeterministic ordering of change log events by first defining deterministic subunits of the transaction that are consistent and do not deviate when used for the calculation of indicia on the multiple nodes redundantly executing the user request. For instance, the deterministic subunits of the transaction may be the subsets of change log entries made on the disk partitions used in the transaction. This subunit may be deterministic when the rows stored in the change log for DML operations made to individual partitions are always in the original application transaction order, or some other order that is deterministic. Other deterministic subunits include:
  A. The deterministic subunits are single events that make up the one or more data manipulation language (DML) or data definition language (DDL) operations of the transaction executing at each node. An alternate embodiment of this subunit approach involves each single event possessing a unique key, and the ordering is by the unique key in the order the changes were made to the event.
  B. The deterministic subunits are identified by disk partitions, disk names, catalog schema, or network connections to the database used by the application.
  C. The deterministic subunits are identified by process, e.g., using the process name or ID, that applies changes to the database used by the application.
  D. The deterministic subunits are defined as the primary or foreign keys of the rows or records.

E. The deterministic subunits are defined by subsets of columns or fields of the database tables being updated.
F. The deterministic subunits are defined by rules such as the relational constraints that define a consistent database.
G. The deterministic subunits are constructed from change log events that matter to the ACID properties for the transaction. The deterministic subunit would, in this case, exclude extraneous operations in the change log for the transaction caused by issues such as unique alternate key constraint violations.
H. The deterministic subunits may exclude operations that are reversed during the transaction such as an insert operation followed by a delete operation of the same row.
I. The deterministic subunits might be a combination of multiple different types of deterministic subunits, such as the ones listed above.

After the deterministic subunits for a transaction are defined, indicia for each subunit is computed. The subunits are then ordered by the computed indicia. In various alternate embodiments, the ordering might be a sort on the subunit indicia values themselves, the primary key and operation on the rows affected, or some other deterministic ordering method. Next, deterministic indicia for the transaction may be calculated from the ordered subunits. These deterministic indicia are then used in validating the transaction with at least one of the other nodes calculating deterministic indicia in the same manner for the same application transaction.

Table 2a and 2b illustrates the preferred embodiment for the example illustrated in Table 1a and 1b.

TABLE 2a

| Node 1: Partitions Flush Order A, B, later B, A | | | |
|---|---|---|---|
| User Application transaction 123 | NODE 1, Disk 1, Partition A Contents | NODE 1, Disk 2, Partition B Contents | NODE 1 CHANGE LOG, Indicia values calculated |
| BEGIN INSERT ROW 1 in Partition A | ROW1 | | BEGIN (implicit) |
| INSERT ROW 2 in Partition B | | ROW2 | |
| <PARTITION A FLUSHES> | | | INSERT ROW 1 (after image stored) |
| <PARTITION B FLUSHES> | | | INSERT ROW 2 (after image stored |
| UPDATE ROW 1 to 1' | ROW 1 to 1' | | |
| UPDATE ROW 2 to 2' | | ROW 2 to 2' | |
| <PARTITION B FLUSHES> | | | UPDATE ROW 2 to 2' (before and after images stored) |
| <PARTITION A FLUSHES> | | | UPDATE ROW 1 to 1' (before and after images stored) |
| | PARTITION A SUBUNIT HASH of two operations on ROW 1 above 0xAB236677 | PARTITION B SUBUNIT HASH of two operations on ROW 2 above 0x3487ABCC | |
| | | | ORDER SUBUNIT HASHES BY hash value: 0x3487ABCC, 0xAB236677 LEVEL 2 VA INDICIA: |

TABLE 2a-continued

| Node 1: Partitions Flush Order A, B, later B, A | | | |
|---|---|---|---|
| User Application transaction 123 | NODE 1, Disk 1, Partition A Contents | NODE 1, Disk 2, Partition B Contents | NODE 1 CHANGE LOG, Indicia values calculated |
| COMMIT | | | HASH OF ORDERED SUBUNIT HASH VALUES FOR TX IN LOG: 0xFFACB2DD MATCHES INDICIA FROM OTHER NODE! Transaction Validated. Vote to COMMIT. COMMIT LEVEL 1 VA INDICIA: HASH OF (4) HASH VALUES FOR TX IN LOG: 0xFFACB2DD MATCHES INDICIA FROM OTHER NODE! Transaction Validated |

TABLE 2b

| Node 2: Partitions Flush Order B, A, later A, B | | | |
|---|---|---|---|
| User Application transaction 123 | NODE 1, Disk 1, Partition A Contents | NODE 1, Disk 2, Partition B Contents | NODE 1 CHANGE LOG, Indicia values calculated |
| BEGIN INSERT ROW 1 in Partition A | ROW1 | | BEGIN (implicit) |
| INSERT ROW 2 in Partition B | | ROW2 | |
| <PARTITION B FLUSHES> | | | INSERT ROW 2 (after image stored) |
| <PARTITION A FLUSHES> | | | INSERT ROW 1 (after image stored |
| UPDATE ROW 1 to 1' | ROW 1 to 1' | | |
| UPDATE ROW 2 to 2' | | ROW 2 to 2: | |
| <PARTITION A FLUSHES> | | | UPDATE ROW 1 to 1' (before and after images stored) |
| <PARTITION B FLUSHES> | | | UPDATE ROW 2 to 2' (before and after images stored) |
| | PARTITION A SUBUNIT HASH of two operations on ROW 1 above 0xAB236677 | PARTITION B SUBUNIT HASH of two operations on ROW 2 above 0x3487ABCC | |
| | | | ORDER SUBUNIT HASHES BY hash value: 0x3487ABCC, 0xAB236677 LEVEL 2 VA INDICIA: HASH OF ORDERED SUBUNIT HASH VALUES FOR TX IN LOG: 0xFFACB2DD MATCHES INDICIA FROM OTHER |

TABLE 2b-continued

Node 2: Partitions Flush Order B, A, later A, B

| User Application transaction 123 | NODE 1, Disk 1, Partition A Contents | NODE 1, Disk 2, Partition B Contents | NODE 1 CHANGE LOG, Indicia values calculated |
|---|---|---|---|
| COMMIT | | | NODE! Transaction Validated. Vote to COMMIT. COMMIT LEVEL 1 VA INDICIA: HASH OF (4) HASH VALUES FOR TX IN LOG: 0xFFACB2DD MATCHES INDICIA FROM OTHER NODE! Transaction Validated |

After application of the preferred embodiment, both nodes participating in this example user transaction compute the Level 1 and 2 VA indicia hash value: 0xFFACB2DD. Therefore, an erroneous mismatch of the transaction completed on the two nodes is avoided after they are exchanged and matched.

Variations on the preferred embodiment of the present invention include:
1. The computed indicia are one or more hash values computed by using SHA 256, MD5, or a CRC.
2. Each single event (operation) has a unique key and the indicia are computed with or uses the unique key.
3. The ordering of the subunits is a hash sort, introsort, bubble sort, or AVL tree sort.
4. The computed deterministic indicia are computed from one or more subunit hash values.
5. The user transaction is validated at one of the nodes by:
   a. exchanging the deterministic indicia with another node,
   b. comparing the deterministic indicia received from the other node with the deterministic indicia computed at the one node, and
   c. validating the transaction at the one node when the deterministic indicia received from the other node matches the deterministic indicia computed at the one node.
   d. The change log events include both before and after images resulting from the DML and/or DDL operations. Insert operations provide the before images. Delete operations provide the after images, and Update operations provide both the before and after images. Adding in the before and after images for the operations and using them in the creation of the indicia allows the validation architecture to detect when the starting database values are not the same between the databases at each of the nodes. This condition can then be separately identified, and optionally used in deciding whether otherwise matching transaction indicia would allow the transaction to commit or cause it to abort.

Batches of Transactions

A variation on the preferred embodiment utilizes batches of transactions, rather than individual transactions, when determining the deterministic subunits of change log events, computing the deterministic indicia, and validating the deterministic indicia with the other nodes. This may speed up the validation process, for example, if large quantities of small transactions with few change log events from the DML and/or DDL operations in each transaction need to be validated. The deterministic subunit might be (i) the same subunit as in the non-batched case, (ii) the entire set of operations in an individual transaction that makes up part of the batch of transactions, or (iii) selected operations across multiple transactions in the batch. An important consideration is that the nodes participating need to pick the same batch of transactions, and subunits of the batch, from the change log to validate or else the produced indicia will not match and the validation process will fail.

A corollary to batches of transactions involves using deterministic subunits of a single transaction which are subsets of the transaction, perhaps by landed order in the change log. For example, if a large transaction has five hundred thousand DML operations to validate, it may be better to validate 1000 operations at a time between the nodes. The total number of validations would then be 500 for this large transaction example. This way of using deterministic subunits of a single transaction provides much prompter recognition that a mismatch will occur rather than waiting for perhaps hours for the large transaction to get to the normal transaction end and then a lengthy Abort/UNDO step would need to be accomplished if a mismatch occurs.

Deterministic Subunit Pre-Conversion

On some nodes of a system, the redundant application processing might produce subunit results that are different because of variations in the hardware or software in use, because of the geographic locales where processing happens, or for other expected and/or predicted reasons. In these cases, a variation on a preferred embodiment uses deterministic subunit pre-conversion. The pre-conversion may happen when the deterministic subunit is being assembled or earlier in the application processing stream. Here are some examples of pre-conversion:

i. Numerical calculations. Different generations of CPU's used on the various nodes might compute floating point or other numeric values with slightly different results, e.g., roundoff errors. An acceptable range, tolerance, or round off might be set for a floating point subunit such as any value calculated from [1.2300 to 1.2400], for example, gets converted to [1.2300]. Accordingly, if one node calculates a value of 1.2301 and the other node calculates the value 1.2302, both would use the [RANGE LOW] value 1.2300 or [RANGE HIGH] value 1.2400, or some other deterministic value when calculating the hash for that subunit. Other variations might use the algorithm round off algorithm, e.g., 1.2301 and 1.2302 always get rounded to 1.2000. Alternatively, a tolerance might be set in some cases if a predicted value is known, e.g., if any value from 1.1000 to 1.3000 is acceptable then the actual value would be converted to 1.2000 before use.
  ii. Proper names and addresses. In this case, one node might find a location of "123 Main Street", another node might find the same location spelled "123 Main St.", so the conversion would be to both use in the subunit hash "123 Main Street" from a fixed list or common database lookup. Another example is a list of alias names like [John. Jonathan, J-dog] would all map to "John" in the subunit indicia calculation.
  iii. Node clocks. Each node in a system has a clock that is normally kept synchronized with the other nodes in the system. However, there are always slight differences, clock drifts, or application processing delays that may affect the actual time retrieved by an application or the database (e.g., a SYSTIME column set on insert). For example, one node might retrieve a time of 11:50:08 PM, whereas another node might retrieve a time of 11:50:09 PM. In this case, the conversion could apply a range or time tolerance to make the deterministic subunit, and use in this example, the value of 11:50 PM on both nodes to complete the deterministic subunit. A variation on this clock variation situation exists for application processing in general. One node might retrieve a time of 11:59:59.999 PM and process the transaction, whereas another node might retrieve a time of 12:00:00.001 AM and either reject it or put it into the next day's batch because the bank is "closed" for one millisecond. So, the pre-conversion might happen very early in the application processing stream. In this case, to determine the rules to apply. e.g., time range, to decide if an application should event accept the user transaction.

The above examples are not intended to be exclusive and many variations of deterministic subunit pre-conversions are envisioned to deal with "fuzzy" and indeterministic subunit values that would otherwise cause the deterministic subunit indicia to mismatch erroneously.

Flowchart for the Preferred Embodiment

FIG. 4 is a flowchart in accordance with the preferred embodiment of the present invention. The figure shows the method operating on one of the nodes executing the redundant transaction.

During Step 401, deterministic subunits of the change log events for the transaction are defined.

The definition requires that each time a similar transaction is executed the subunits are unaffected by flush order, CPU load, network congestions, and anything else that would affect the creation of a subunit of the transaction in a repeatable manner. In the case of HPE DP2/TMF disk flushing the deterministic subunit is the set of updates to a partition of a disk involved in the transaction. TMF always flushes the data to disk for that partition in the order in which the operations happened on that partition. If there is no control at all on a particular system, the deterministic subunit may wind up being the individual DML and/or DDL operations of the transaction, or the individual events that were changed by the operations.

During step 402, indicia are computed for each deterministic subunit of the change log events. Usually, the computing will be a hash of the operations in the subunit. The operation type may be added to the hash and both the before and after images of the operation may be needed to ensure determinacy.

During step 403, subunits are ordered by the computed indicia. The ordering is usually a sort, either ascending or descending, of the indicia for the subunits. Other types of ordering might be used such as an AVL tree.

During step 404, the ordered subunit indicia are brought together to compute the deterministic indicia for the transaction. Again, this computation could use a hash of the ordered subunits indicia or it could consist of the values themselves.

During step 405, the transaction is validated with at least one of the other nodes using the deterministic indicia. Typically, this will involve exchanging over a network the deterministic indicia calculated on the node with the other nodes to which the transaction distributor sent the user transaction.

During step 406, if the system is configured as a Level 2 VA and the validation indicates a match, the transaction is committed. However, if the validation indicates a mismatch it is aborted. If the system is configured as a Level 1 VA and it does not match, the transaction may be rolled back via an UNDO tool or a restore of the database may be warranted from an online or offline backup.

Apparatus of a Preferred Embodiment

FIG. 5 shows the hardware for a system that implements a preferred embodiment. Specifically, the Transaction Distributor hardware duplicates user transactions (requests) to process a transaction and sends them to the nodes (1 and 2) that are participating in a Validation Architecture configuration. Those nodes each contain an instance of the Database, and a Processor running on one or more CPUs or cores of the hardware of the node. Running inside the Processor are the Operating System, Application, and an Indicia Engine. The Indicia Engine reads the Database change log and is configured to deterministically calculate the indicia as specified in the Detailed Disclosure. The Transaction Distributor communicates to the Application instances on Nodes 1 and 2. Each Application makes changes to the Database accessible at that node, and the Indicia Engine reads and processes those changes from the database change log to compute the deterministic indicia. The Indicia Engine exchanges its deterministic indicia with the other nodes participating in the Validation Architecture. If the Indicia Engine determines that the received data is valid (i.e., matches) then it instructs the Database to commit or abort the associated transaction locally if configured as a Level 2 VA, or accept or UNDO the transaction if configured as a Level 1 VA.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for validating transactions in a system that includes indeterministic ordering of change log events by using deterministic indicia, the system including a plurality of nodes, each node in the system including (i) an instance of a database used by an application, and (ii) a change log associated with the instance of the database used by the application, each node redundantly executing the same transactions, each transaction including one or more data manipulation language (DML) or data definition language (DDL) operations, wherein results of the DML or DDL operations are stored in the change log as change log events, wherein the order of the change log events stored in the change log on one node is in a different order than the order of change log events stored in the change log of at least one of the other nodes, the method comprising for each transaction executing at each node:

(a) defining deterministic subunits of the change log events, wherein the deterministic subunits of the change log events are consistent and do not deviate when used for computing deterministic indicia for the redundant transaction executing at each of the nodes;

(b) computing indicia for each deterministic subunit of the change log events;

(c) ordering the deterministic subunits of the change log events by the computed indicia;

(d) computing deterministic indicia for the transaction from the ordered deterministic subunits; and (e) validating the transaction with at least one of the other nodes using the deterministic indicia, the validation indicating either a match or a mismatch of the deterministic indicia computed at the plurality of nodes.

2. The method of claim 1 wherein the deterministic subunits are single events that make up the one or more DML or DDL operations of the transaction executing at each node.

3. The method of claim 1 further comprising:
(f) committing the transaction when the validating indicates a match.

4. The method of claim 1 further comprising:
(f) aborting the transaction when the validating indicates a mismatch.

5. The method of claim 1 further comprising:
(f) undoing the transaction when the validating indicates a mismatch.

6. The method of claim 1 wherein the deterministic subunits are identified by disk partitions of the database used by the application.

7. The method of claim 1 wherein the deterministic subunits are identified by processes that apply changes to the database used by the application.

8. The method of claim 1 wherein the computed indicia are one or more hash values.

9. The method of claim 1 wherein each single event has a unique key and the computed indicia include the unique key.

10. The method of claim 1 wherein the ordering is a sort of the deterministic subunits by the computed indicia.

11. The method of claim 1 wherein the computed deterministic indicia are computed from one or more deterministic subunit hash values.

12. The method of claim 1 wherein the transaction is validated at one of the nodes by:
(i) exchanging the deterministic indicia with another node,
(ii) comparing the deterministic indicia received from the other node with the deterministic indicia computed at the one node, and
(iii) validating the transaction at the one node when the deterministic indicia received from the other node matches the deterministic indicia computed at the one node.

13. The method of claim 1 wherein the change log events include both before and after images of the DML or DDL operations.

14. The method of claim 1 wherein the computing of indicia for each deterministic subunit of the change log events includes pre-converting each deterministic subunit.

15. A method for validating batches of transactions in a system that includes indeterministic ordering of change log events by using deterministic indicia, the system including a plurality of nodes, each node in the system including (i) an instance of a database used by an application, and (ii) a change log associated with the instance of the database used by the application,
each node redundantly executing the same transactions, each transaction including one or more data manipulation language (DML) or data definition language (DDL) operations, wherein results of the DML or DDL operations are stored in the change log as change log events, wherein the order of the change log events stored in the change log on one node is in a different order than the order of change log events stored in the change log of at least one of the other nodes, the method comprising for each batch of transactions executing at each node:
(a) defining deterministic subunits of the change log events, wherein the deterministic subunits of the change log events are consistent and do not deviate when used for computing deterministic indicia for the redundant transaction executing at each of the nodes;
(b) computing indicia for each deterministic subunit of the change log events;
(c) ordering the deterministic subunits by the computed indicia;
(d) computing deterministic indicia for the batch of transactions from the ordered deterministic subunits; and
(e) validating the batch of transactions with at least one of the other nodes using the deterministic indicia, the validation indicating either a match or a mismatch of the deterministic indicia computed at the plurality of nodes.

16. The method of claim 15 wherein the deterministic subunits are single events that make up the one or more DML or DDL operations of the batch of transactions executing at each node.

17. The method of claim 15 further comprising:
(f) committing each transaction in the batch of transactions when the validating indicates a match.

18. The method of claim 15 further comprising:
(f) aborting each transaction in the batch of transactions when the validating indicates a mismatch.

19. The method of claim 15 further comprising:
(f) undoing each transaction in the batch of transactions when the validating indicates a mismatch.

20. The method of claim 15 wherein the deterministic subunits of the change log events are individual transactions that make up the batch of transactions.

21. The method of claim 15 wherein the deterministic subunits are identified by disk partitions of the database used by the application.

22. The method of claim 15 wherein the deterministic subunits are identified by processes that apply changes to the database used by the application.

23. The method of claim 15 wherein the computed indicia are one or more hash values.

24. The method of claim 15 wherein the ordering is a sort of the deterministic subunits by the computed indicia.

25. The method of claim 15 wherein the computed deterministic indicia are computed from one or more deterministic subunit hash values.

26. The method of claim 15 wherein the batch of transactions is validated at one of the nodes by:
(i) exchanging the deterministic indicia with another node,
(ii) comparing the deterministic indicia received from the other node with the deterministic indicia computed at the one node, and
(iii) validating the transaction at the one node when the deterministic indicia received from the other node matches the deterministic indicia computed at the one node.

27. The method of claim 15 wherein the batch of transactions is read from contiguous transactions in the change log.

28. The method of claim 15 wherein the change log events include both before and after images of the DML or DDL operations.

29. The method of claim 15 wherein the computing of indicia for each deterministic subunit of the change log events includes pre-converting each deterministic subunit.

* * * * *